Jan. 8, 1963  J. L. G. OLLER  3,072,788
CASSETTE HOLDER ASSEMBLY
Filed Aug. 31, 1960  3 Sheets-Sheet 1
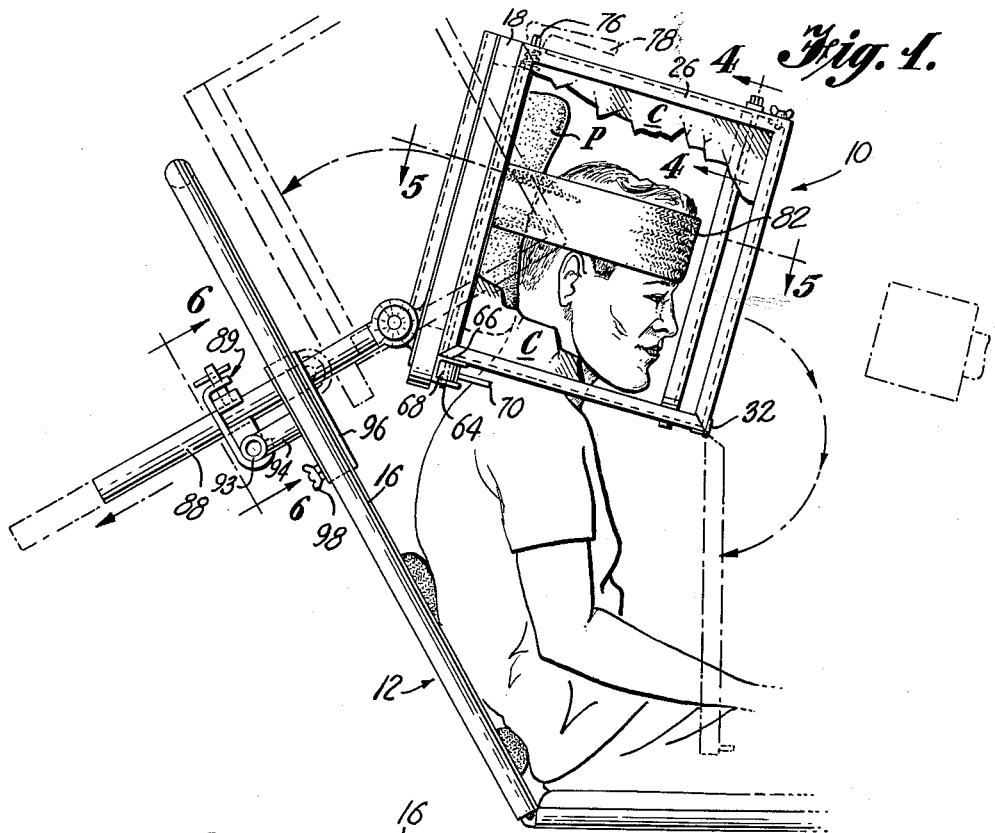
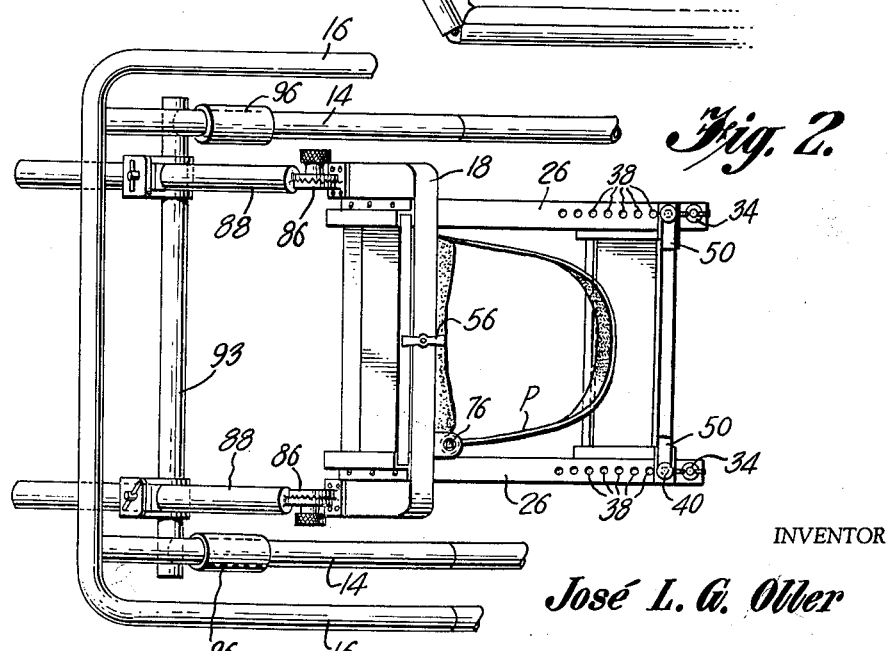
INVENTOR
José L. G. Oller
BY
Mason, Fenwick & Lawrence
ATTORNEYS

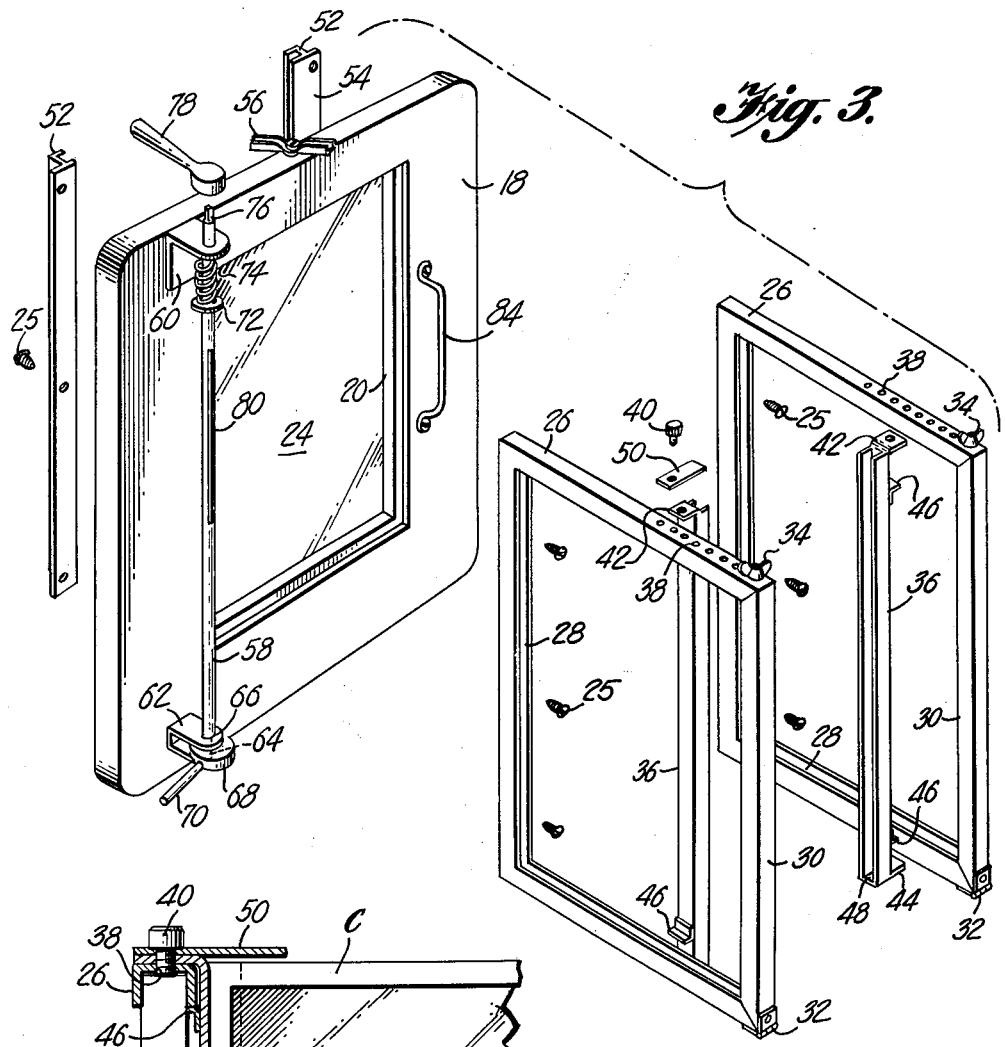

Jan. 8, 1963  J. L. G. OLLER  3,072,788
CASSETTE HOLDER ASSEMBLY
Filed Aug. 31, 1960  3 Sheets-Sheet 3

INVENTOR
José L. G. Oller
BY Mason, Fenwick & Lawrence
ATTORNEYS

United States Patent Office 3,072,788
Patented Jan. 8, 1963

3,072,788
CASSETTE HOLDER ASSEMBLY
Jose L. Garcia Oller, 3401 Nashville Ave.,
New Orleans, La.
Filed Aug. 31, 1960, Ser. No. 53,269
12 Claims. (Cl. 250—50)

This invention relates generally to a supporting and positioning means. More particularly, the present invention relates to a cassette holder assembly which supports a patient's head and a plurality of cassettes in a manner to surround the head, in order that various X-ray studies may be made from different sides of the head.

In relatively recent years, the art and skill of the surgeon has improved to the extent that cranial surgery is almost commonplace in the hospitals of today. A factor which has contributed to the surgeon's skill and knowledge is the fact that X-rays can provide accurate showings of the problems to be faced during the operation. However, as is generally known, it is necessary that the subject and the X-ray film remain relatively stationary in order to produce a clear and well defined print that will show the proper details required for an intelligent analysis by the surgeon. For inanimate objects, this is not too much of a problem, but for human beings it was found that slight movement of the head produced worthless films.

Attempts were made to solve this problem by securing the head by one device and the films or cassettes by another, but this failed, since some relative motion often occurred between the film and the subject.

Additionally, it is desirable to quickly expose a plurality of films which will provide the basis for anterior, posterior and lateral studies of the head. However, the prior art did not provide any substantially useful device which permitted the rapid exposure of the required films while maintaining the head in a predetermined position relative to the films. Therefore, it often became necessary to expose and remove from the cassette holder successive cassettes while repositioning the patient's head for the following exposure.

Consequently, it is an important object of this invention to provide a cassette holder assembly which maintains the head of a patient in a predetermined position relative to the cassettes.

Another object of this invention is the provision of a cassette holder assembly which surrounds the patient's head and which permits the exposing of a plurality of films.

An additional object of this invention is to provide a simple means on a cassette holder assembly for holding a patient's head stationary within the assembly.

Another object of this invention is the provision of a novel lock means on the means for holding a patient's head at a predetermined distance from the cassettes.

A further object of the invention is to provide means on the cassette holder assembly which permits freedom of movement of the assembly accordingly as the patient's head is to be moved relative to the X-ray source.

A still further object of the present invention is the provision of adjusting means on the anterior cassette holder to enable the X-ray film to be positioned properly to allow for forward flexion of the neck and head toward the chest.

Another object of this invention is to provide a simple, economical yet extremely effective apparatus for holding a patient's head within surrounding cassettes.

Other objects will become apparent as the description of a practical embodiment of the invention proceeds when read in conjunction with the accompanying drawings, in which:

FIGURE 1 shows a side elevational view of the cassette holder assembly in operation. Also shown in phantom are the various spacial positionings for the cassette holder assembly;

FIGURE 2 is a top plan view of the cassette holder assembly;

FIGURE 3 is an exploded view of the cassette holder showing the manner in which it is secured to the frame;

FIGURE 4 is an elevational view in section, along the line 4—4 of FIGURE 1;

Figure 5:
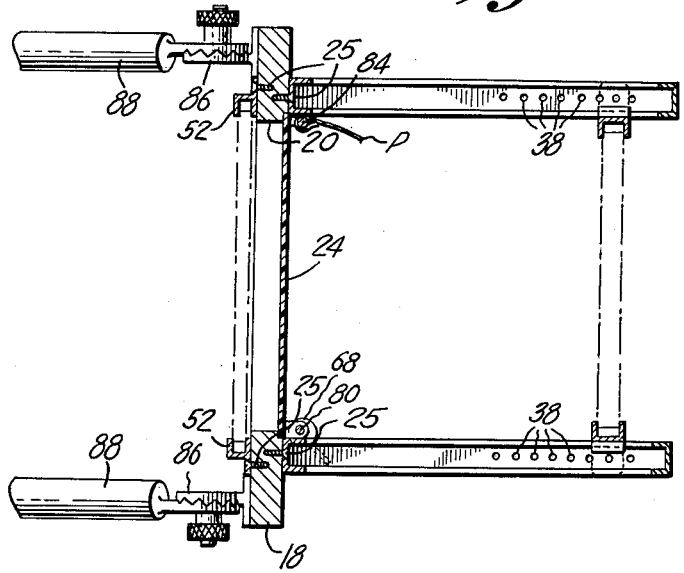
FIGURE 5 is a sectional view along the line 5—5 of FIGURE 1.

The novel cassette holder assembly constituting the present invention comprises a frame having guide members constituting cassette holders attached thereto to form a box-like enclosure in which the cassettes are positioned to surround the head of a patient to be X-rayed. The frame also is provided with means for maintaining the head gripping means in a predetermined position within the cassette holder assembly, and also is provided with lock means to maintain a proper degree of tension on the head gripping means, such that the proper relative positions of the head and cassette are assured. In addition, the novel cassette holder assembly is provided with means to permit the spatial movement of the assembly.

More specifically, the novel cassette holder assembly denominated generally as 10 in FIGURE 1, is positioned upon a structure generally called a "Ferris wheel" (not shown), because of the fact that it revolves in a vertical plane with a patient held bodily within the structure, thus enabling the X-ray camera to make various exposures of film positioned near the patient. This "Ferris wheel" does not form a part of the present invention. The cassette holder assembly is supported within this "Ferris wheel" in any suitable manner, such as shown in FIGURE 1. The novel aspects of this invention begin with the chair 12, formed of inner and outer tubular members 14 and 16, which are connected to the periphery of the "Ferris wheel" in a conventional manner as by welding.

The cassette holder assembly 10 which is mounted on the chair 12, includes a frame member 18, formed of wood or other suitable material. The frame, as best seen in FIGURE 3, is rectangular in shape and includes an opening 20 in its face. This opening is rabbeted at its forward face to provide a shoulder upon which a transparent piece of glass, plastic, or similar transparent and X-ray penetrating means can be positioned. Suitably secured to the front face of the frame as by screws 25, are a pair of guide members or cassette holders 26. As best shown in FIGURE 3, the guide members are rectangularly shaped to accommodate cassettes C therein. There is further provided in the interior of the cassette holders 26, slideway grooves 28 around the periphery of the cassette holder. The purpose of these grooves is primarily to provide a stable supporting means for the cassette holders contained therein. Access to the cassettes within the cassette holder is provided as shown in FIGURE 3, by reason of the hinged front element 30 of the cassette holder 26, which pivots about the point 32, as shown in FIGURE 1, and is held in closed position by screws 34 on FIGURE 3.

The cassette holders 26 are primarily designed to position the cassettes which hold the X-ray films that will provide lateral studies of the patient's head. For the anterior studies, upright channel shaped cassette holders 36 are provided which are adjustably secured along the cassette holders by reason of the plurality of aligning openings 38, as clearly shown in FIGURES 3 and 5. The channel shaped cassette holders 36 are maintained at a desired location along the cassette holder 26, by reason of screws 40 and flange members 42 on the channel member cooperating with the openings 38. A similar flange member 44 is provided on the bottom of each channel member, and rides along the bottom of the lower horizontal portion of the cassette holder. Similarly as with flange 42, screws 40 are designed to hold flange 44 to the holder 26, by reason of openings 38 at the bottom of the lateral holder 28. Intermediate the flanges 42 and 44 are ledges 46 which are adapted to engage the top of the lower horizontal member of the cassette holder. Thus, it will be seen that by reason of the intermediate ledges 46 and the upper and lower flanges 42 and 44, the channel members are maintained perpendicular to the horizontal portions of the cassette holder 26. For improved stability of the channel shaped cassette holders 36, screw means are provided through the lower flanges 44 and into the cassette holders 26.

The channel shaped cassette holders 36 are designed and adapted to slidingly receive cassettes C within their grooved portions, and are seated therein by reason of the closed end member 48 provided in each holder 36. As previously stated, the cassette holder assembly is designed to operate within a "Ferris wheel," and thus, it is necessary that in order to prevent the cassettes from sliding out of the anterior holders 36, when in inverted position, a stop means must be provided. The stop means takes the form of an elongated stop 50, which is held tightly in place by reason of screws 40. As can be seen in the operative position, stop 50 will extend inwardly towards the cassette C, as shown in FIGURE 4.

In order to support a cassette for posterior studies of the patient's head, channel cassette holders 52 are provided and are positioned on the opposite side of the frame 18, as compared to the lateral and anterior cassette holders 26 and 36, respectively. As shown in FIGURE 3, the cassette holders for the posterior cassette are channel shaped, but include a longitudinal flange extension 54 through which the holders 52 may be secured to the frame 18, such as by conventional screw means 25. The rear cassette holders 52 have a closed end member (not shown), which is similar to that shown at 48 of the front cassette holder 36. To prevent the cropping out of the cassette from its rear holder 52 upon the cassette holder assembly being inverted by turning the "Ferris wheel," pivoted stop means is provided, as shown at 56.

Secured to the front portion of the frame 18 is an elongated spindle 58, which is rotatably held to the frame by means of L-shaped flange 60 and U-shaped flange 62. The spindle at its lower end has a reduced stem portion 64 and a shoulder 66. The U-shaped flange 62 is suitably bored to receive the stem 64, and therefore, the shoulder 66 abuts the upper leg of the flange 62. Carried on the stem 64 between the legs of the U-shaped flange 62 is a rotatable cam 68, which is eccentrically mounted on the stem of the spindle. Handle means 70 is provided on the cam 68, in order that the cam may be rotated into a wedging position against the bottom portion of the flange 62, and therefore, forces the stem 64 against its bore in both legs of the U-shaped flange 62, thus to frictionally lock the spindle in any desired position. At its upper end, the spindle 58 is provided with a collar 72 immovably affixed to the spindle, and which supports a resilient means in the form of spring 74, adapted to cooperate with the lower portion of the flange 60 and the collar 72 to urge the spindle downwardly into the lower flange 62 to the limit permitted by the shoulder 66. The upper end 76 of the spindle is adapted to receive a wrench 78 for rotating the spindle within the flanges at a time when the cam 68 is not wedging the stem against the flanges 62.

As shown in FIGURE 3, the spindle is slotted at 80, in order to receive the loose end of the flexible head gripping means 82, best shown in FIGURE 1. This band is secured to the frame 18 in any suitable means such as the anchoring wire 84, and is adapted to have its loose end inserted in slot 80 of the spindle after it has passed over the forehead of the patient, and then the wrench 78 rotates the spindle to put tension on the band, thus urging the head rearwardly towards the glass 24 in the frame 18. Upon being properly positioned, wedge 68 operates to hold the spindle in the desired position. As shown in FIGURE 1, it may be desirable to provide a pillow P between the head of the patient and the glass 24, both for the comfort of the patient and for the ease of positioning the head within the cassette holder assembly.

Figure 6:
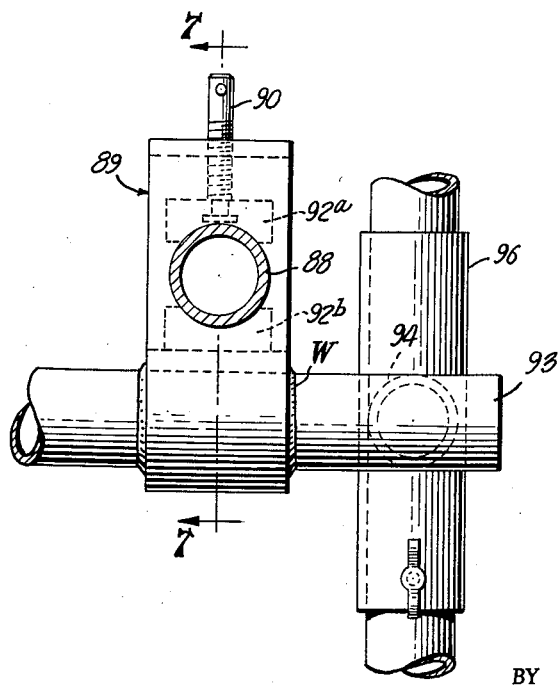
FIGURE 6 is a sectional view along the line 6—6 of FIGURE 1.
Figure 7:
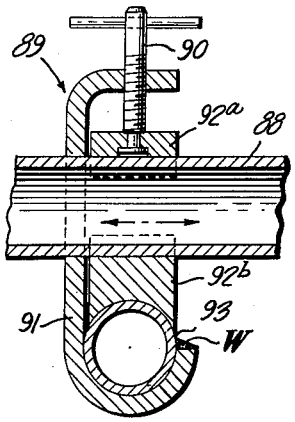
FIGURE 7 is a sectional view along the line 7—7 of FIGURE 6.

In order to accommodate the various positions desirable between the patient's head and the X-ray film within the cassette, it is important that the cassette holder assembly 10 be adapted to move in any direction within a vertical plane passing through the "Ferris wheel" and the patient's body. Such a means is provided by the sunburst joint 83, which is suitably secured to the rear of the frame 18 at one side, and to tubular supporting members 88 on its other side. This tubular member 88 is further designed to be permitted sliding movement through a conventional locking jaw 89, having screw means 90 operating through strap 91, the jaw members 92a and 92b, the lower stationary jaw 92b being held to the cross tubular member 93. The locking jaw and the cross member 92 are made integral by suitable means such as welding, shown in FIGURES 6 and 7. Thus, it can be seen that the tubular supports may be moved axially relative to the cross member 93, by loosening the jaw members of the locking jaw 89, and held from such movement by tightening the screw of the locking jaw, as is clearly shown in the drawings. As best shown in FIGURE 1, a connecting piece 94 is made integral at one end to cross member 93, and at the other end to sleeve 96. Sleeve 96 is made slidable upon the inner tubular members 14 of the chair 12 and held in any desired position by a conventional wing nut screw 98.

It can be seen, therefore, that the cassette holder assembly is permitted the various degrees of movement in a vertical plane, such as the pivoting of the frame 18 about the sunburst joint 86, as well as the linear movement provided by the sliding connection of tubular support 88 in the locking jaw 89. Phantom lines in FIGURE 1 show both the pivoting about the sunburst joint positioning, as well as the linear movement through the locking jaw 89. In addition to this, substantially vertical movement is permitted by sliding movement of the sleeve 96 on the inner member 14 of the chair 12. With these degrees of movement it can be readily seen that the cassette holder assembly may be positioned in any desirable manner, such that the cassettes within the cassette holder surround the patient's head and may easily be adjusted such that the desired spacing between the head and the cassettes is maintained.

The operation of the cassette holder assembly is relatively simple and undoubtedly is apparent from the foregoing detailed description. However, a short outline of the mode of operation may be helpful to the understanding of the invention, which is as follows. The patient is seated on the chair 12, which is held within the surrounding "Ferris wheel," and the cassette holder assembly adjusted to surround the patient's head, such that the cassettes are substantially perpendicular to the impinging rays of the X-ray camera. The band 82 which is anchored at 84, is placed around the forehead of the patient and pillow P placed at the rear of the head against the glass 24 in the frame 18. The loose end of the band 82 is then inserted in the slot 80 of the rotatable spindle 58. The wrench 78 is then applied to the upper end of the spindle 76 in a manner to rotate the spindle and wind the band thereon. When the band has sufficient tension to force the head backward towards the frame 18, and is in proper position, the eccentric cam 68 which is rotatable on the spindle 58, is rotated independently of the spindle by its handle 70, such that it is wedged between the reduced stem portion 64 of the spindle and the base portion of the U-shaped flange 62. A variation of this construction is now seen, since the head may be positioned within the cassette holder assembly before the cassettes are placed therein. Thus, the proper positioning of the head may be assured without having the cassettes obscure the aligning and positioning of the head. After the head is properly positioned within the cassette holder, the cassettes may be placed within the holders by simply loading the front and rear cassette holders from the top by moving stops 50 and 56, respectively, to the side and loading lateral cassette holders 26 by releasing front hinge portion 30 of the lateral holder 26 through means 34, thereby exposing the guideways for insertion of the cassettes. Securing the front members 30 by screws 34 and stops 50 and 56 of the front and rear cassette holders, respectively, the cassettes are secure within the cassette holder assembly, even if the cassette holder assembly is inverted by reason of the turning of the "Ferris wheel." It is also to be pointed out that the front cassette holder 36 may be adjustably positioned along the lateral cassette holders 26, by reason of the screws 40 being placed in selected openings 38 in the top of the lateral cassette holder. Such an adjustment allows for forward flexion of the neck and head toward the chest, and thereby assures the maintaining of a proper distance between the head and the cassette.

During the turning of the "Ferris wheel" it can be seen that the head is always maintained at exactly the same position relative to the cassettes, and therefore, all exposures of the X-ray film will be exactly as desired. Upon completion of the various exposures, pivoting of the stop members 50 and 56 and opening of front members 30, permit the removal of the cassette.

From the foregoing detailed description, it will be evident that there are a number of changes, adaptations, and modifications of the present invention which come within the province of those skilled in the art. However, it is intended that all such variations not departing from the spirit of the invention, be considered as within the scope thereof as limited solely by the appended claims.

What is claimed is:

1. A cassette holder assembly comprising a frame, holder means on the frame adapted to support a plurality of cassettes defining a laterally enclosed space, head gripping means secured to said frame maintaining the head of a patient in a substantially fixed position within the enclosed space, and means cooperating with said frame for spatially positioning said holder, said head gripping means and the patient's head in a desired position.

2. A cassette holder assembly comprising a frame, holder means on the frame adapted to support a plurality of cassettes defining a laterally enclosed space, said means comprising guide members arranged in a box-like outline which are adapted to removably receive and position cassettes at a fixed predetermined distance from each other, head gripping means secured to said frame maintaining the head of a patient in a substantially fixed position within the enclosed space, and means cooperating with said frame for spacially positioning said holder, said head gripping means and the patient's head in a desired position.

3. A cassette holder assembly comprising a frame, holder means on the frame adapted to support a plurality of cassettes defining a laterally enclosed space, said means comprising guide members arranged in a box-like outline which are adapted to removably receive and position cassettes at a fixed predetermined distance from each other, said guide members including anterior guide members movable relative to the other guide members to permit the variable positioning of an anterior cassette, head gripping means secured to said frame maintaining the head of a patient in a substantially fixed position within the enclosed space, and means cooperating with said frame for spacially positioning said holder, said head gripping means and the patient's head in a desired position.

4. A cassette holder assembly comprising a frame, holder means on the frame adapted to support a plurality of cassettes defining a laterally enclosed space, head gripping means secured to said frame maintaining the head of a patient in a substantially fixed position within the enclosed space, said head gripping means comprising a flexible band adapted to bear against the forward portion of the head, and means cooperating with said frame for spacially positioning said holder, said head gripping means and the patient's head in a desired position.

5. A cassette holder assembly comprising a frame, holder means on the frame adapted to support a plurality of cassettes defining a laterally enclosed space, head gripping means secured to said frame maintaining the head of a patient in a substantially fixed position within the enclosed space, said head gripping means comprising a flexible band adapted to bear against the forward portion of the head, a spindle rotatably secured to one side of the frame upon which one end of said band is wound, the other end of said band being fixed to the other side of the frame, and means cooperating with said frame for spacially positioning said holder, said head gripping means and the patient's head in a desired position.

6. A cassette holder assembly comprising a frame, holder means on the frame adapted to support a plurality of cassettes defining a laterally enclosed space, head gripping means secured to said frame maintaining the head of a patient in a substantially fixed position within the enclosed space, said head gripping means comprising a flexible band adapted to bear against the forward portion of the head, a spindle rotatably secured to one side of the frame upon which one end of said band is wound, the other end of said band being fixed to the other side of the frame, said spindle being provided with lock means for preventing rotation of the spindle to maintain a predetermined amount of tension in said band whereby to exert a desired rearwardly directed pressure upon said head, and means cooperating with said frame for spacially positioning said holder, said head gripping means and the patient's head in a desired position.

7. A cassette holder assembly comprising a frame, holder means on the frame adapted to support a plurality of cassettes defining a laterally enclosed space, head gripping means secured to said frame maintaining the head of a patient in a substantially fixed position within the enclosed space, said head gripping means comprising a flexible band adapted to bear against the forward portion of the head, a spindle rotatably secured to one side of the frame upon which one end of said band is wound, the other end of said band being fixed to the other side of the frame, said spindle being provided with lock means for preventing rotation of the spindle to maintain a predetermined amount of tension in said band whereby to exert a desired rearwardly directed pressure upon said head, said lock means comprising an eccentrically mounted cam rotatably secured along the length of the spindle and cooperating with the frame to frictionally lock the spindle in a desired position, and means cooperating with said frame for spacially positioning said holder, said head gripping means and the patient's head in a desired position.

8. The construction related in claim 7, wherein the spindle includes a reduced stem portion and a shoulder at one end, said frame being provided with a bracket having a bore therein adapted to rotatably receive said spindle stem and abut said spindle shoulder, resilient means on said spindle urging said spindle shoulder against said bracket, the construction and arrangement being such that the eccentric cam forces the spindle stem against said bracket bore to lock said spindle against rotation.

9. A cassette holder assembly comprising a frame, holder means on the frame adapted to support a plurality of cassettes defining a laterally enclosed space, said means comprising guide members arranged in a box-like outline which are adapted to removably receive and position cassettes at a fixed predetermined distance from each other, said guide members including anterior guide members movable relative to the other guide members to permit the variable positioning of an anterior cassette, head gripping means secured to said frame for maintaining the head of a patient in substantially fixed position within the enclosed space, said head gripping means comprising a flexible band adapted to bear against the forward portion of the head, a spindle rotatably secured to one side of the frame upon which one end of said band is wound, the other end of said band being fixed to the other side of the frame, said spindle being provided with lock means for preventing rotation of the spindle to maintain a predetermined amount of tension in said band whereby to exert a desired rearwardly directed pressure upon said head, said lock means comprising an eccentrically mounted cam rotatably secured along the length of the spindle and cooperating with the frame to frictionally lock the spindle in a desired position and means cooperating with said frame for spacially positioning said holder means, said head gripping means and the patient's head in a desired position.

10. The construction recited in claim 9, wherein said spindle is provided with a slot to receive said flexible band.

11. The construction recited in claim 9, wherein the spindle includes a reduced stem portion and a shoulder at one end, said frame being provided with a bracket having a bore therein adapted to rotatably receive said spindle stem and abut said spindle shoulder, resilient means on said spindle urging said spindle shoulder against said bracket construction and arrangement being such that the eccentric cam forces the spindle stem against said bracket bore to lock said spindle against rotation.

12. A cassette holder assembly for X-raying a patient's head comprising a frame, cassette holder means secured to said frame and adapted to support and position a plurality of cassettes surrounding a patient's head and head gripping means secured to said frame to maintain the head in a substantially fixed position spaced a predetermined distance from each surrounding cassette.

References Cited in the file of this patent
UNITED STATES PATENTS

| | | |
|---|---|---|
| 1,440,401 | May | Jan. 2, 1923 |
| 2,027,318 | Nelson | Jan. 7, 1936 |
| 2,717,314 | Delk | Sept. 6, 1955 |